United States Patent Office 3,141,872
Patented July 21, 1964

3,141,872
POLYMERIZATION CATALYST AND STEREO-
SPECIFIC POLYMERIZATION OF PROPYL-
ENE THEREWITH
Giulio Natta, Milan, Piero Pino, Pisa, and Giorgio Mazzanti, Milan, Italy, assignors to Montecatini Societa Generale per l'Industria Mineraria e Chimica, Milan, Italy
No Drawing. Filed Apr. 14, 1960, Ser. No. 22,134
Claims priority, application Italy Dec. 3, 1954
6 Claims. (Cl. 260—93.7)

This invention relates to a new process for the selective polymerization of certain unsaturated hydrocarbons. More particularly, the invention relates to a process for producing, at will, polymers of unsaturated hydrocarbons which are predominantly to substantially made up of isotactic macromolecules.

The unsaturated hydrocarbon polymerized has the formula $$CH_2=CHR$$

in which R is a saturated aliphatic, an alicyclic, or an aromatic radical.

In our pending applications Serial Nos. 514,097 (now abandoned), 514,098, and 514,099, all filed on June 8, 1955, we have described new, regular linear head-to-tail polymers of the unsaturated hydrocarbons as well as methods for producing the same.

This application is a continuation-in-part of our said applications Ser. Nos. 514,097, 514,098 and 514,099.

The method described in said applications involves the use of polymerization initiators or catalysts, prepared by reacting a catalytic heavy metal compound and a catalytic metal alkyl compound together in the dissolved state.

The catalytic metal alkyl compound used in preparing the catalyst comprises a substance or mixture of substances consisting of simple and complex compounds the molecules of which contain as a central atom an element from the second and third columns of the Periodic Table, i.e., beryllium, magnesium, and aluminum.

The valences of the aforesaid central atom are linked to the same or different alkyl radicals such as ethyl, propyl, butyl, etc. One valence of the central atom may be satisfied by halogen or by an alkoxy radical.

The polymers we obtained, which are mixtures of linear, head-to-tail amorphous and crystalline polymers having no branches longer than R are unique in this art. That both types of polymers are linear is shown by their infra-red spectra. For example, in the case of our polypropylene, both the amorphous and crystalline polymers have similar infra-red spectra which are completely different from the infra-red spectra of the known branched polypropylene in which the branches are longer than R.

When monomer units some of which contain an asymmetric carbon atom having an $l$ configuration and some of which contain an asymmetric carbon having a $d$ configuration recur statistically along the polymer chain, as is the general case for all known vinyl polymers, the polymer may be considered as a copolymer of the two types of structural units. If the substituent R is much larger than an H atom, the polymer (or copolymer in the sense just explained) is substantially non-crystalline and does not have any 1st order transition temperature.

Prior to our work, the only known example of a vinyl polymer existing in both an amorphous and in a crystalline form were the polyvinyl ethers prepared by Schildknecht and co-workers (Ind. Eng. Chem. 40 (1948), 2104; ibid 41 (1949), 1198, 2891). Those polyvinyl ethers are, of course, quite different from the polymeric products we have disclosed.

In our applications Ser. Nos. 514,097, 514,098 and 514,099, and particularly in Ser. No. 514,099, we have shown polymers which exhibit crystallinity and are made up of macromolecules having a particular stereoregular structure in which, for at least long portions or sections of the main chain, the tertiary asymmetric carbon atoms of successive monomeric units have, on the same chain section, the same steric configuration, those macromolecules being made up of regularly repeating —$CH_2$— and —CHR— groups in long chains forming a regular pattern, as shown more particularly in our pending application Ser. No. 514,099, as follows:

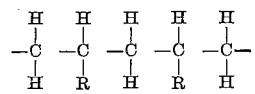

or as shown in the model of a portion of such a macromolecule which is given in each of our said pending applications and which model is repeated hereinbelow.

When all the R groups of a plurality of chains show the above-mentioned regular arrangement, the polymers tend to adopt a crystalline structure. This is confirmed by examination with X-rays. We shall refer to the regular enchainment of the asymmetric carbon atoms in the main chain, which is a basic condition for crystallinity of our polymers, as "isotactic."

Our linear, regular head-to-tail macromolecules having substantially no branches longer than R and the main chain of which has substantially a structure of the kind illustrated in the model below (isotactic structure)

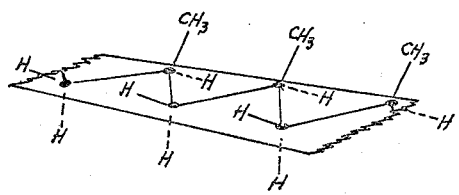

[Model of a portion of the main chain of a crystalline (isotactic) polymeric alpha-olefin according to the present invention, arbitrarily fully extended in a plane, in which the R substituents on the tertiary C atoms of the successive monomeric units of the chain portion shown are all above and their H atoms are all below the plane of said chain section]

are recognized in the art following us as "isotactic macromolecules," whereas our macromolecules having substantially no branches longer than R and in which the asymmetric carbon atoms of the two possible steric configurations have a substantially random distribution along the main chain are recognized in the art following us as "linear, regular head-to-tail atactic" macromolecules.

We have adopted the new term "isotactic" for identifying the structure shown in the model, the macromolecules having substantially that kind of structure, and polymers consisting of these macromolecules having substantially that kind of structure (see, for example the Natta et al. communication to the editor of the Jr. of the Amer. Chem. Soc., published in said Journal on March 20, 1955, received for publication December 10, 1954; and the Natta article published in the Jr. of Polymer Science, April 1955, vol. XIV, issue No. 82, pp. 143–154, received for publication on February 17, 1955).

The main chain when in the crystalline state, assumes a coiled configuration, the spiral having a pitch corresponding to a definite number of monomeric units, generally three. In such case, all bonds between the R groups and the main chain have the same angle of inclination relative to planes perpendicular to the axis of the spiral.

On the other hand, whenever the polymerization leads to a random distribution of the orientation of the side chain in relation to the plane of the main chain, an amorphous product results.

If the side chains, i.e., the groups R, are of considerable length compared with the distance of the carbon atoms in the main chain from one another, and if they possess a great mobility, said chains will obstruct the arrangement of a plurality of chains to form a crystal. The melting point of the crystalline polymers of the linear alpha-olefins generally decreases by increasing length of the R groups. Polymers containing isotactical chains generally show, besides a tendency to crystallize, also greater density, higher softening or melting temperature and lower solubility, compared with the "non-isotactic" products of equal molecular weight.

If the arrangement of asymmetric carbon atoms is "isotactic" crystallinity of the polymers occurs already at relatively low molecular weights, e.g., from about 1000 upward.

Although we were able to produce the polymers comprising the mixtures of amorphous and crystalline polymers from the unsaturated hydrocarbons using the catalysts described above (and disclosed in our pending applications supra), no method was available for "steering" the polymerization so as to predetermine the ratio of the amorphous polymers to crystalline polymers contained in the polymerizate.

Such "steering" is accomplished by the process of the present invention according to which we produce polymerizates of preselected character and which consist prevailingly of the crystallizable polymers.

According to a main feature of our invention, polymerizates of the unsaturated hydrocarbons consisting substantially of the isotactic macromolecules are obtained by using, for the preparation of the polymerization aid, a solid crystalline titanium halide in which the titanium has a valence lower than the maximum valence corresponding to its position in the Periodic Table.

Polymerization aids which favor the production of isotactic polymers must contain, always, and however they are produced, a crystalline portion. (By "crystalline portion" is meant a portion which presents a regularity of structure resulting from the distribution of its atoms in a crystal lattice.) The best catalysts for the production of isotactic polymers are obtained from a solid crystalline Ti compound which in reacting with the metallo-organic compounds does not undergo destruction of its crystal lattice.

The catalyst prepared from $TiCl_3$ which yields, preferentially, isotactic polymers, shows, in fact, the same violet color as the $TiCl_3$ itself.

The percentage of isotactic polymer in the resulting product is, in general, highest when the polymerization agent is prepared by starting with a pure, non-oxidized, non-hydrated $TiCl_3$ which is substantially free of $TiCl_4$.

When preparing the polymerization aid from the powdery (crystalline solid) titanium trichloride, suspended in, e.g., a hydrocarbon, adding thereto a metal alkyl compound such as triethyl aluminum or diethyl aluminum monochloride, and subsequently heating the suspension to 50–90° C., a catalyst is obtained which permits control of the polymerization of the unsaturated hydrocarbons so that the polymers substantially made up of isotactic macromolecules are obtained.

According to our preferred embodiment, the metal alkyl compound, such as aluminum triethyl, is dissolved in the unsaturated hydrocarbon to be polymerized and the solid, crystalline titanium trichloride is then brought into contact with the metal alkyl component in the presence of the unsaturated hydrocarbon.

We have discovered that the state of aggregation or the phase in which the catalyst is brought into contact with the unsaturated hydrocarbon monomer to be polymerized is of considerable importance in controlling the formation of a polymerizate having a high degree of crystallizable isotactic macromolecules.

We assume that when these solid, crystalline catalysts show, to a given extent, solid regular surfaces close to reactive metal alkyl linkages, they are particularly adapted for acting as catalysts in the formation of polymers having an isotactic arrangement of the asymmetric carbon atoms in the main chains and a correspondingly crystalline nature.

By polymerizing propylene with our polymerization agent obtained from aluminum triethyl and the titanium trichloride we can obtain directly a polypropylene which is predominantly to substantially non-extractable with boiling n-heptane and which is highly crystalline at the X-rays. In contrast, propylene polymer obtained with the polymerization agent prepared from $TiCl_4$ and aluminum triethyl is prevailingly extractable with boiling n-heptane and exhibits a low crystallinity at the X-rays.

The influence exerted by the nature of the polymerization aid or catalyst in the polymerization of the unsaturated hydrocarbons or alpha-olefins can be explained in the following manner:

During the polymerization process, using a crystalline agent, the alkyl chain of the heavy metal-alkyl linkages grows by reaction with the monomeric olefin molecules by inserting the latter into the linkages between the heavy metal atoms and the alkyl groups present on the surfaces of the crystals so as to form a growing paraffinic molecule which, due to its saturated nature, is less strongly adsorbed to the crystal surfaces than the olefinic monomer. Successive molecules of the monomer are adsorbed on the crystal surfaces and can then insert themselves between the heavy metal-alkyl groups linkages. If the successive monomer molecules are all oriented in the same way, a polymerization product of very regular structure and, therefore, crystallizable, will be obtained. On the other hand, if the molecules of the monomer are not similarly oriented due to a lack of "orienting surface" on the catalyst, an amorphous, non-crystallizable polymerization product results.

In our pending application Ser. No. 550,164, filed November 30, 1955, we disclosed our new stereospecific catalysts prepared from an organometallic compound and a low valency crystalline halide of transition metals, i.e., halides in which the metal has a valency lower than the valency corresponding to its position in the Periodic Table.

We also showed that our stereospecific catalyst prepared from violet crystalline titanium trichloride and, e.g., triethyl aluminum has the same violet color as the $TiCl_3$ itself, and when used for the polymerization of the unsaturated hydrocarbon, in a hydrocarbon solvent in which the catalyst is insoluble, the polymerization is oriented to the selective production of isotactic polymers, i.e., polymers made up of isotactic macromolecules as defined.

Thus, we disclosed that, in the case of propylene, for instance, it is possible to orient the polymerization to the production of linear high polymers from about 75% to about 90% of which are not extractable from the crude polymerizate with boiling n-heptane, by using the stereospecific catalyst prepared from aluminum triethyl and the titanium trichloride.

When propylene is polymerized with the aid of a catalyst prepared from diethyl beryllium and the crystalline titanium trichloride, crude polymerizates are obtained having an exceptionally high content (95% and higher) of isotactic macromolecules which are nonextractable with boiling n-heptane.

The use of the highly stereospecific catalysts prepared from the alkyl beryllium compound and the solid crystalline $TiCl_3$ is particularly advantageous when it is desired to produce crude polymerizates having a high content of isotactic, crystallizable macromolecules and which can be used directly for the production of films, fibers or other shaped articles, without solvent fractionation.

The polymers obtained by polymerizing the unsaturated hydrocarbon with the aid of the present catalysts are particularly useful for the production of textile fibers having high tenacity and a silky, non-greasy hand.

In general, for ready shaping by melt-extrusion methods, the polypropylene having the high content of isotactic macromolecules should have an intrinsic viscosity which is not higher than 1.4.

Polypropylenes obtained by polymerizing propylene with the catalysts prepared from the titanium trichloride have the high content of isotactic macromolecules and are particularly useful for the production of such articles as textile fibers and films.

The present catalysts are prepared by contacting the solid, crystalline $TiCl_3$ with an organometallic compound which, as stated, may be an alkyl compound of beryllium, magnesium or aluminum in which the valences of the metal are linked to the same or different alkyl radicals containing 2 to 4 carbon atoms (ethyl, propyl, butyl), or such an alkyl compound of the metal in which one of the valences of the metal is satisfied by halogen.

The following examples illustrate in detail certain specific embodiments of the invention.

Example I

Into a 435 cm.³ oscillating autoclave are introduced two stainless steel balls and a vial containing 1.85 g. (0.012 mole) titanium trichloride; a solution of 3.9 g. tripropyl aluminum in 100 cm.³ heptane is then added under nitrogen. The autoclave is heated to 73° C. and at this temperature 90 g. propylene are introduced. The autoclave is then set in motion so as to break the vial. This leads to the formation of a coarsely dispersed catalytic agent. After 10 hours' reaction at a temperature between 70 and 75° C., the reaction product is taken out. It appears as a solid very compact mass containing a large amount of adsorbed solvent. The purification is carried out by washing with diluted hydrochloric acid, as described previously. 72 g. of a solid white polypropylene are obtained, which are then fractionated by extraction with hot solvents.

The acetone extract corresponds to 3.5% of the obtained polymer and is formed by oily, low molecular weight products.

The ether extract corresponds to 13.3% of the total, and is formed of a solid amorphous polypropylene, showing an intrinsic viscosity of 0.725 (in tetralin at 135° C.), which corresponds to a molecular weight of about 20,000.

The heptane extract corresponds to 11.4% of the total and consists of a polypropylene having an intrinsic viscosity of 0.9, i.e., a molecular weight of about 28,000. Under the X-rays, this fraction appears to consist of polypropylene with a crystallinity higher than 50%.

The extraction residue is 71.8% of the total, and is formed of a highly crystalline polypropylene having an intrinsic viscosity of 3.08, i.e., a molecular weight of about 180,000.

Example II 7 g. of $TiCl_3$, purified of the traces of titanium tetrachloride by repeated washing in nitrogen atmosphere with anhydrous n-heptane, are introduced in a 2080 ml. autoclave, 11.4 g. triethyl aluminum in 500 cc. n-heptane and 310 g. pure propylene are added. The autoclave is heated to 80° C. and kept in motion for about 10 hours at this temperature.

The polymerization product is then taken out and purified as usual. 240 g. of polypropylene are obtained which are fractionated with hot solvents, with the following results:

|  | Percent of the total | Remarks |
|---|---|---|
| Acetone extract | 3.5 | Amorphous. |
| Ether extract | 3.4 | Do. |
| n-Heptane extract | 4.0 | 50% crystalline. |
| Extraction residue | 89.1 | Highly crystalline. |

Example III

A glass vial containing 2 g. $TiCl_3$ in 30 ml. n-heptane is introduced into a 435 ml. autoclave together with a steel ball (1 inch diameter) to break the vial at the moment the polymerization is to be started. A solution of 5.7 g. triethylaluminum in 50 ml. n-heptane is then introduced into the autoclave under nitrogen atmosphere and the autoclave is heated up to 70° C. At this moment 103 g. of liquid propylene are admitted and soon afterwards the autoclave is put in motion in order to break the $TiCl_3$ vial.

A slight temperature increase is noticed, while the pressure decreases slowly but continuously. After 6 hours, during which the temperature is kept between 80 and 90° C. when a pressure decrease is no longer observed, 50 ml. methanol are pumped into the autoclave in order to decompose the catalyst, and the residual gases, containing 10 Nl. of propylene, are released. From the autoclave a solid, compact mass is discharged, which is first purified as described in the foregoing example and then with concentrated HCl while swelling the mass with boiling toluene. The product is then coagulated with methanol, filtered and washed with methanol and dried by heating under vacuum.

82 g. of polymer are obtained, corresponding to a 79.6% conversion of the employed propylene. Said polymer is made up mostly (85%) of crystalline polypropylene, which may be separated from the non-crystalline products (15%) by extraction with solvents.

The amorphous portion is entirely soluble in acetone; the greatest portion soluble in warm ether has a softening point of 100° C., an intrinsic viscosity of 0.685 and a molecular weight of about 18,000. The crystalline portion, insoluble in warm heptane, has a softening point of 165° C., an intrinsic viscosity of 2.39 and a molecular weight about 120,000.

Example IV

A glass vial containing 8 g. titanium trichloride and 3 steel balls are introduced in a 2150 ml. autoclave. A solution of 12 g. diethyl aluminum monochloride in 500 ml. n-heptane is then introduced under nitrogen. After heating to 76° C., 365 g. of technical propylene (85% propylene) are added.

Soon afterwards the autoclave is shaken to cause the breaking of the $TiCl_3$ vial. Agitation is continued, at temperatures in the range 80-90° C. When a temperature decrease is no longer observed the gases are released and 235 g. of polymer are obtained, corresponding to a 75% conversion of the employed propylene. The obtained product is made up mostly (84%) of crystalline polypropylene, which can be separated from the non-crystalline products by extraction with solvents.

Example V

A suspension of 0.5 g. titanium trichloride in a solution of 0.64 g. diethyl beryllium in 250 cc. n-heptane is introduced under nitrogen into a previously deaerated shaking autoclave of 100 cc. capacity, kept at 70° C. After about 10 minutes the autoclave is connected with a propylene tank and a propylene constant pressure of 2.4 atm. is then maintained. After 3½ hours the polymerization is stopped by introducing 50 cc. methanol into the autoclave. The reaction product, which consists of a very fine powder suspended in n-heptane, is then discharged. The polymer is purified from inorganic products present by treatment with methanol and hydrochloric acid. After complete coagulation with methanol, the product is filtered, washed and vacuum dried in the warm. 11 g. polypropylene in the form of a powdery white solid are thus obtained. The product is fractionated by extraction with boiling solvents in a Kumagawa extractor, using in succession acetone, ether and heptane.

The acetone extract corresponds to 0.8% of the total polymer. The ether extract (1% of the polymer obtained) consists of a linear, head-to-tail atactic polymer having an intrinsic viscosity of 0.25 in tetrahydronaphthalene solution at 135° C.

The heptane extract (2.2%) consists of polypropylene partially crystalline by X-rays examination, having an intrinsic viscosity of 0.31.

The residue of the heptane extraction, corresponding to 96% of the total polymer, consists of isotactic polypropylene, highly crystalline under the X-rays and having an intrinsic viscosity of 3.1. This fraction, further extracted with n-octane, yields an extract corresponding to 19% and a residue showing a melting point of 174–175° C. under the polarizing microscope.

*Example VI*

Operating exactly as described in Example V, but with a higher catalyst concentration( i.e. employing 1.27 g. diethyl beryllium and 1 g. titanium trichloride), 13 g. of polypropylene are obtained after 1½ hours. 94% of the crude polypropylene is non-extractable with boiling n-heptane and has a high crystallinity when examined under the X-rays. The intrinsic viscosity of this fraction is 3.02.

*Example VII*

A solution of 1.4 g. beryllium ethyl monochloride in 250 cc. n-heptane, and 0.5 g. titanium trichloride are introduced into a shaking stainless steel autoclave of approximately 1 liter capacity.

The autoclave is then heated to 75° C., which temperature is kept constant during the reaction, and propylene is added up to a pressure of 3.4 atmospheres (gauge). This pressure is kept constant for approximately 17 hours. Thereafter, the reaction product is taken out and purified as previously described. 48 g. of solid, powdery polymer having an intrinsic viscosity of 1.43 are thus isolated.

After extraction with boiling n-heptane, 93% of the product remains undissolved.

The known methods for obtaining violet crystalline $TiCl_3$ include the following:

Reduction of $TiCl_4$ with various metals, such as sodium, magnesium, zinc, aluminum, titanium (see e.g. Heller and Polanyi, Trans. Faraday Soc. 32 (1936), 633; Ruff and Neumann, Z. Anorg. Ch. 128 (1923), 81–95; Klemm and Krose Z. Anorg. Ch. 253 (1947), 209–17). The reduction with aluminum, preferably in the presence of added aluminum trichloride, results in the production of a violet crystalline composition consisting essentially of $TiCl_3$ and $AlCl_3$.

Reduction of $TiCl_4$ with hydrogen at high temperatures (see e.g. Klemm and Krose, l.c.; Goerges and Stähler, Ber. 42 (1909), 3200–18).

Reduction of $TiCl_4$ with organometallic compounds under particular conditions.

Heating the brown modification obtained by reduction of $TiCl_4$ with hydrogen at low temperatures (see Böck and Moser, Monatsh. 34 (1913), 1825).

All these methods result in reduction products which comprise, or consist essentially of violet crystalline $TiCl_3$, useful in preparing our catalysts. Some of the products lead to catalysts which are more active than others in the polymerization of propylene to polymers having a somewhat higher content of isotactic macromolecules.

Instead of violet crystalline $TiCl_3$, other low valency solid crystalline compounds of transition metals can be used in preparing catalysts for the directive polymerization of propylene, as we have disclosed.

The ratio of the violet crystalline $TiCl_3$ to the metal alkyl or alkyl metal monohalide is not critical. The amount of catalyst used in carrying out the polymerization is sufficient to promote the reaction so that it proceeds at a commercially feasible rate, and can be determined readily.

The polymerization is carried out in a liquid diluent which is substantially inert to the metal alkyl or alkyl metal halide, in the substantial absence of air and water, and preferably under an atmosphere of an inert gas such as nitrogen.

The hydrocarbon solvents which may be used in preparing the catalyst, and as the polymerization medium, are preferably paraffinic hydrocarbons including a light gasoline (substantially free of olefinic bonds), n-heptane, iso-octane and the like. Anhydrous benzene may also be used. The hydrocarbon solvent may also be the monomer to be polymerized.

The polymerization may be carried out at temperatures between 20° C. and 120° C. and under atmospheric pressure or a low pressure up to 30 atms. above normal atmospheric pressure.

The solvent fractionation of the crude polymerizate shown in the examples was performed, mostly, for analyzing the polymerizate and establishing the proportion of isotactic macromolecules non-extractable with boiling n-heptane contained therein.

In practice, and because of the high content of isotactic macromolecules in the polymerizate, which makes it useful directly as obtained for purposes for which isotactic polypropylene is useful, the polymerizate which separates spontaneously from the solvent often may be simply washed with alcohols to remove the occluded catalyst, and after drying is ready for use.

This application is a continuation-in-part of our application Ser. No. 550,164, filed November 30, 1955.

What is claimed is:

1. A polymerization catalyst consisting essentially of the product formed by mixing (1) a solid, violet crystalline material comprising violet crystalline titanium trichloride with (2) a dialkyl aluminum monohalide in which the alkyl groups contain from 2 to 4 carbon atoms, the mixing being carried out at a temperature up to 90° C. in a liquid diluent substantially inert to said monohalide, to obtain a catalyst in which none of the titanium is reduced below the trivalent state.

2. A polymerization catalyst according to claim 1, characterized in that the dialkyl aluminum monohalide (2) mixed with the violet crystalline material is a dialkyl aluminum monochloride.

3. A polymerization catalyst according to claim 1, characterized in that the dialkyl aluminum monohalide (2) mixed with the violet crystalline material is diethyl aluminum monochloride.

4. A process for polymerizing propylene with a catalyst prepared from (1) a solid, violet crystalline material comprising violet crystalline titanium trichloride and (2) a dialkyl aluminum monohalide in which the alkyl groups contain from 2 to 4 carbon atoms, which process comprises forming the catalyst by mixing (1) and (2) at a temperature up to 90° C. and in a liquid diluent substantially inert to the dialkyl aluminum monohalide, to obtain a catalyst in which none of the titanium is reduced below the trivalent state, and then polymerizing propylene with said catalyst at a temperature between 20° C. and 120° C. in a liquid diluent substantially inert to the dialkyl aluminum monohalide.

5. A process according to claim 4, characterized in that the catalyst is prepared from (1) a solid, violet crystalline material comprising violet crystalline titanium trichloride and (2) a dialkyl aluminum monochloride.

6. A process according to claim 4, characterized in that the catalyst is prepared from (1) a solid, violet crystalline material comprising violet crystalline titanium trichloride and (2) diethyl aluminum monochloride.

References Cited in the file of this patent

UNITED STATES PATENTS

| | | |
|---|---|---|
| 2,862,917 | Anderson et al. | Dec. 2, 1958 |
| 2,893,984 | Seelback et al. | July 7, 1959 |
| 2,905,645 | Anderson et al. | Sept. 22, 1959 |

FOREIGN PATENTS

| | | |
|---|---|---|
| 1,139,806 | France | Feb. 18, 1957 |
| 526,101 | Italy | May 14, 1955 |